United States Patent [19]

Stecher

[11] Patent Number: 5,133,146

[45] Date of Patent: Jul. 28, 1992

[54] BLADE FISHING LURE

[76] Inventor: Scott Stecher, Box 939, Port Clinton, Ohio 43452

[21] Appl. No.: 658,106

[22] Filed: Feb. 20, 1991

[51] Int. Cl.⁵ .............................................. A01K 85/00
[52] U.S. Cl. ..................... 43/42.5; 43/42.47; 43/42.51
[58] Field of Search .............. 43/42.5, 42.51, 42.49, 43/42.47, 42.45, 42.46, 42.48

[56] References Cited

U.S. PATENT DOCUMENTS

| | | | |
|---|---|---|---|
| 1,875,122 | 8/1932 | Olson | 43/42.5 |
| 2,511,002 | 6/1950 | Perry | 43/42.5 |
| 2,632,277 | 3/1953 | Cogswell | 43/42.49 |
| 2,657,495 | 11/1953 | Eppinger | 43/42.5 |
| 2,717,468 | 9/1955 | Clough | 43/42.51 |
| 2,907,131 | 10/1959 | Bugge | 43/42.51 |
| 3,094,804 | 6/1963 | Walton | 43/42.5 |
| 3,187,457 | 6/1965 | Kausch | 43/42.47 |
| 3,896,580 | 7/1975 | Williams | 43/42.5 |
| 4,453,333 | 6/1984 | Olson | 43/42.5 |
| 4,862,629 | 9/1989 | Ryan | 43/42.47 |

Primary Examiner—Kurt Rowan
Attorney, Agent, or Firm—Douglas L. Tschida

[57] ABSTRACT

A molded, lead bodied fishing lure including a relatively large surfaced, concave blade portion. In various constructions, the lure comprises a stamped metal blade insert which supports multiple hooks and includes multiple hook and line receiving mountings. In other constructions, the body includes movement enhancing contours; supports multiple blades or blades providing multiple zones of concavity or blades arranged to form a sound chamber for rattle members; supports live bait holders or various attractors; and permits standup presentations.

19 Claims, 12 Drawing Sheets

BLADE FISHING LURE

BACKGROUND OF THE INVENTION

The present invention relates to fishing lures and in particular to a blade type lure including a heavy weight body and a projecting, concave blade portion which acts as a tiller.

Among the vast numbers of styles, sizes and types of fishing lures, one category of lures are generally denoted as "blade baits". Such lures typically comprise two sections, a bulbous, weighted forward portion and a relatively thin, stamped metal blade portion. Depending upon the balance point of the lure relative to a line attaching aperture, the hooks are variously positioned about the lure body.

Due to the dominance of the forward weighted body and the use of flat or slightly twisted blades, such lures do not exhibit significant amounts of side-to-side movement when retrieved under a relatively constant line tension. Trailing portions of the blades may be bent to induce vibration, but which typically is tightly constrained to the retrieval path. Multiple line attachment points may also be used to vary lure movement. In general, however, and even when jigged in a suspended presentation or intermittently jerked during a constant retrieval, the lure does not respond with wide-sweeping, exaggerated motion.

Moreover, due to the relatively straight lines and planar organization, prior art lures do not present desirable slow fall properties when descending to depth. Many of the prior art blade lures of which Applicant is aware are particularly described in an article by D. Stange, entitled "Blades, Walleyes and More", *In Fisherman*, Book 96, pp. 48-55 (December/January, 1990).

In contrast to blade lures, Applicant is also aware of large bodied stamped metal, spoon type lures which exhibit concavities. These lures do not include relatively heavy weighted body sections. Thus, spoon lures normally run at shallower depths than blade lures, unless the dimensions of the lure are increased, other weights are attached to the fishing line or the lure is attached to a down rigger assembly. Spoon lures exhibit a distinguishable wobbling motion when retrieved in contrast to the higher vibrating movement of blade lures.

SUMMARY OF THE INVENTION

It is accordingly a primary object of the present invention to provide a blade type fishing lure with improved lure movement properties which slowly descends to deeper depths than spoon lures and which is adaptable to a variety of fishing patterns.

It is a further object of the invention to provide a lure including at least one concave blade portion.

It is a further object of the invention to provide a lure including a relatively heavy weight body which is molded about a blade portion exhibiting a concavity over its entire surface.

It is a still further object of the invention to provide a lure which includes a number of line, hook and accessory attaching apertures at the body and blade portions, whereby lure motion can be varied.

It is a further object of the invention to provide a blade portion including multiple zones of concavity or multiple blades.

It is a further object of the invention to provide a lure with blades arranged to create a sound chamber and also enhance lure movement.

Various of the foregoing objects, advantages and distinctions of the invention are particularly achieved in a presently preferred assembly which includes an elongated, weighted forward body. The body is formed from molten lead which is molded about a concave blade. The body projects from the forward end of the blade, with the blade being tilted approximately 10 to 20 degrees relative to the body.

The blade otherwise comprises a stamped, planar metal member which is formed to exhibit a concavity over substantially its entire surface area. The blade exhibits an elongated shape, terminating in pointed ends, and includes a plurality of attachment apertures. The blade may exhibit rounded ends, less elongation or may include multiple zones of concavity.

In various alternative constructions, multiple blade portions may be secured to the body and/or blade. A sound chamber may be created by the blades to support a rattle member. The body may be formed and positioned to maintain the lure upright, when in contact with the bottom. Means for securing natural bait or other attractors to the lure may also be included.

The foregoing objects, advantages and distinctions of the invention, among others, as well as a detailed description of the invention are provided below with respect to the appended drawings. It is to be appreciated that the following description is illustrative only of various presently preferred constructions and should not be interpreted in limitation of the scope of the invention. To the extent various modifications have been considered, they are described as appropriate. Still other modifications and improvements may, however, be made without departing from the scope of the invention.

DESCRIPTION OF THE PREFERRED EMBODIMENT

FIGS. 1 through 4 show a number of drawings of one construction of the present fishing lure from various angles and perspectives. With reference thereto, the lure 2 generally comprises a relatively heavy, molded body 4 and a blade 6 which is molded as an insert into the body 4. The blade 6 is formed as a stamped metal member to a desired shape and is particularly constructed to exhibit a concavity 8 over the entire or a substantial portion of the surface area of the blade 6. Exemplary blades known in the art which might be provided are so called willow, Indiana, Colorado, French or fluted blades. Additional details of illustrative, alternative blade configurations and lures incorporating the foregoing features are discussed below.

The concavity 8 not only enhances the qualities of the lure action, but also facilitates the attachment of the blade to the body 4. That is, with the molding of the body 4 about the concavity 8, the body becomes securely bonded to the blade with minimal likelihood of loosening. The bonding may, however, be enhanced by providing apertures in the blade through which the molten metal flows and/or forming the blade to include protrusions, barbed or otherwise, which become embedded within the lure body 4. The depth of the concavity may also be increased. This will not only facilitate the mounting but lure motion. Loosening might otherwise occur over time with normal use, for example, if the lure encounters jarring forces, such as when fished in rocks or gravel. Alternatively, the body 4 or blade 6 may partially oxidize and detach from one another.

The body 4, otherwise, is presently formed from molten lead in an elongated, generally ovular shape. Depending upon the lure size (i.e. 1/16, $\frac{1}{8}$, or $\frac{1}{4}$ oz, etc.), the volume of lead is varied and the blade size is dimensionally varied. Preferably, the body 4 extends in the range of one-half to three-fourths the length of the blade. This is in contrast to prior art blade lures. Alternative metals or relatively heavy weight lead substitutes may also be used. Inlet regions 10 are formed on the front and rear surfaces of the body 4 and apertures 12 are let into the body 4 to accommodate the mounting of a forward hook 14 to the blade 6. An aft hook 16 is secured to an aperture 12 at the upper trailing surface of the blade 6.

Figure 1:
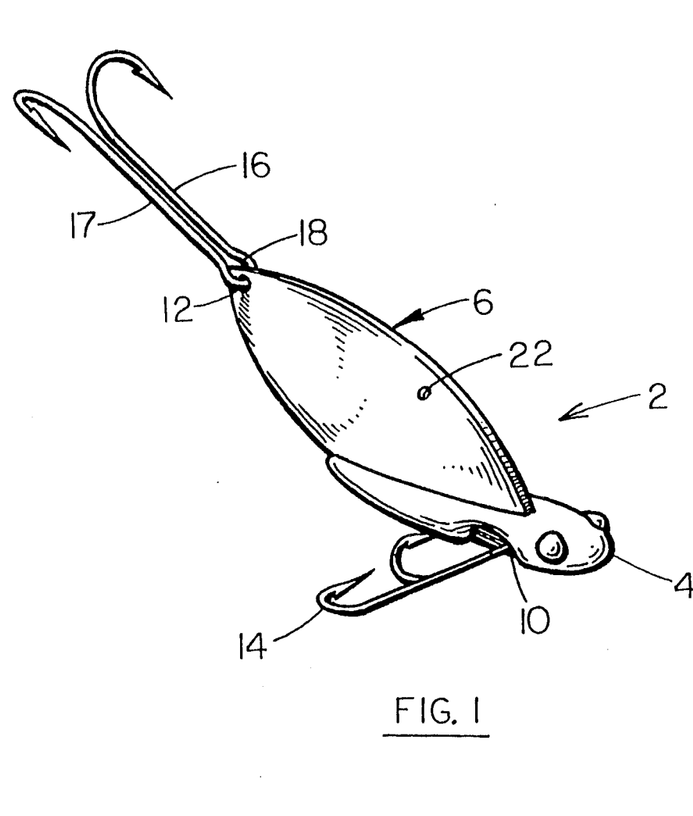
FIG. 1 is a perspective drawing of one construction of the present lure.
Figure 2:
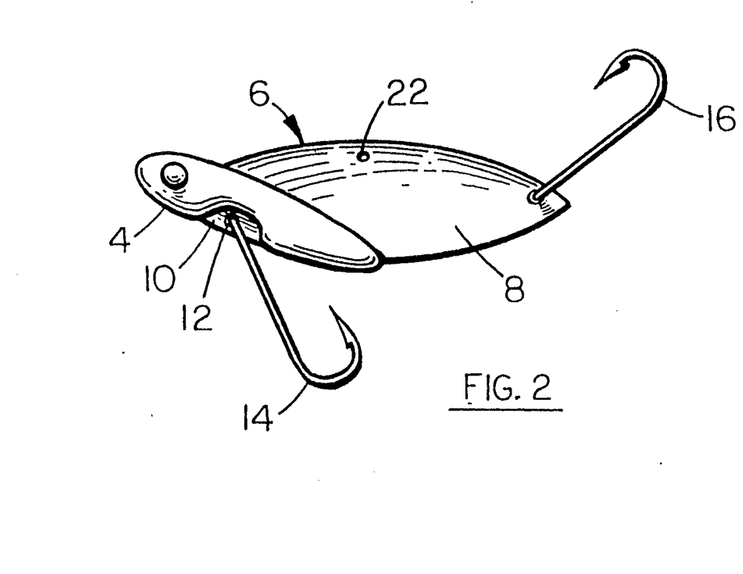
FIG. 2 is a drawing of a rear elevation view of the lure of FIG. 1.
Figure 3:
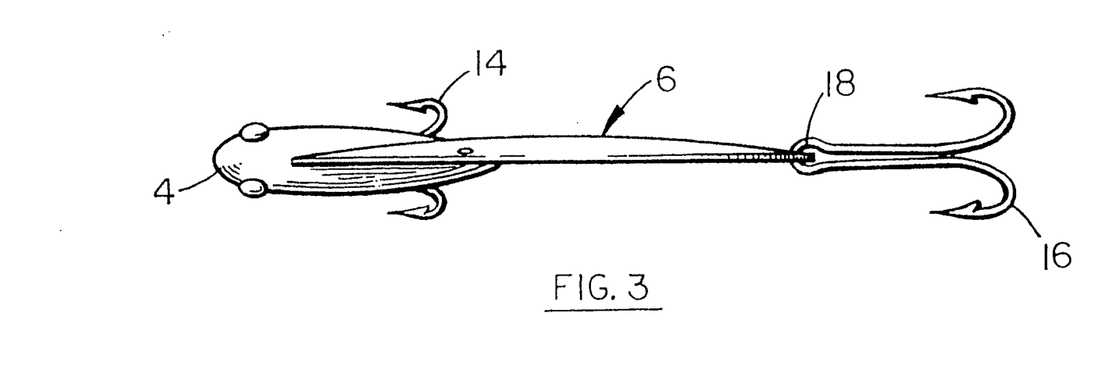
FIG. 3 is a drawing of a top plan view of the lure of FIG. 1.
Figure 4:
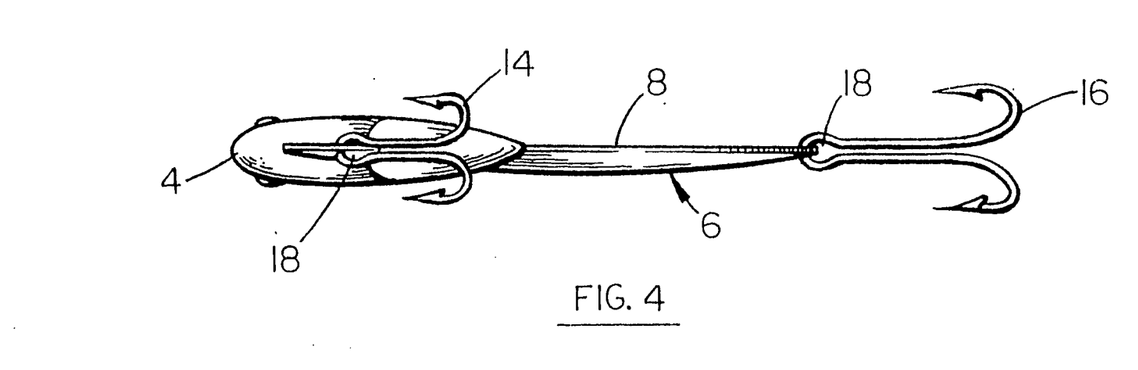
FIG. 4 is a drawing of a bottom plan view of the lure of FIG. 1.
Figure 5:
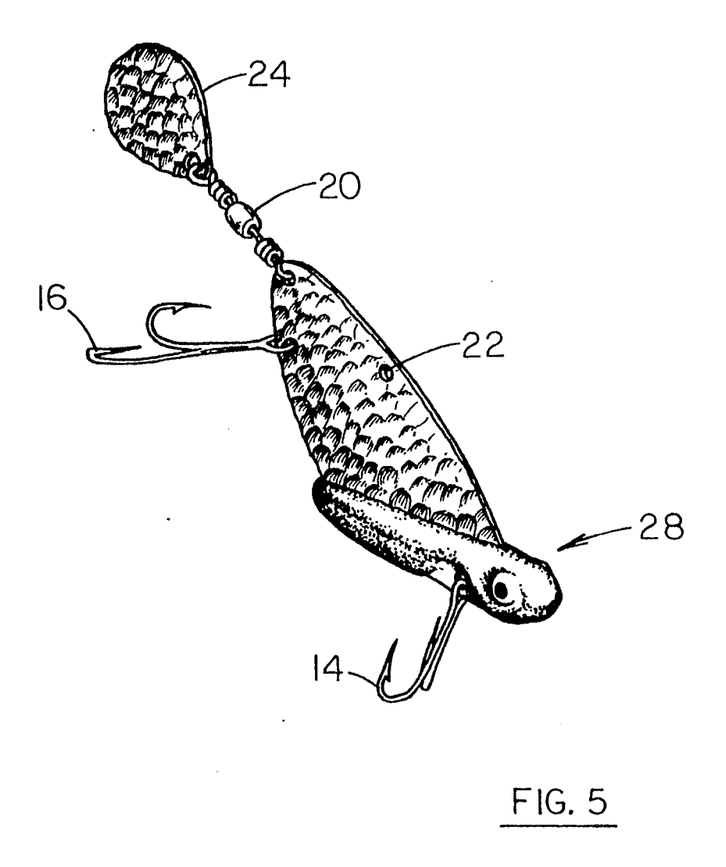
FIG. 5 is a drawing of a lure having a hammer finished blade containing a swivel supported trailer blade.

Split shank, double barbed hooks extend from the blade 6 which are easily mounted upon threading the hook shank 17 through the mounting apertures 12 until the blade 6 is restrained at an 0 shaped region 18 of the hook shank 17. It is to be appreciated that treble or single hooks may also be used. Securing these hooks to the blade 6 may require the use of split-rings (not shown), swivels 20 (reference FIG. 5) or other fasteners. Alternatively, these hooks may similarly include a channel including shank construction.

In combination, the shape of the body 4 and blade 6 exhibit the appearance of a winged insect of indiscriminate type. Numerous other appearances may, however, be exhibited by merely varying the shape and positioning of the body 4 or blade 6. Preferably, the shape should appeal to the purchaser, but more importantly should cooperate with the blade to induce preferred retrieval patterns and/or fall characteristics.

The body 4 is otherwise positioned relative to the blade 6 such that the body 4 supports the lure upright as the lure is retrieved. This presents a maximum exposure of the concave surfaces of the blade 6 to the traversed water. Desirable fluttering and vibrations are thus obtained with lure movement. Applicant has also discovered that when retrieved with a continuous line retrieval the lure tends to track to the right and lift slightly. Thus, the lure advantageously fished like a lighter weight lure (i.e. relative to feel) but at deeper depths than possible with a lighter weight lure.

By particularly positioning a portion of the body 4 to extend beyond the forward end of the blade 6 and distributing the weight over a greater length of the body 4, the exposed area of the concavity 8 is increased. The exposure of the concavity 8 can also be adjusted by varying the position of a line attachment aperture 22 or the line relative to a plurality of apertures 22 provided for this purpose. Depending, too, upon the shape of the blade 6, the shape and positioning of the body 4 may be varied to obtain desired lure action. Normally the blade 6 is canted such that longitudinal axis through the body 4 and blade 6 lie at a vertical angle in the range of 10 to 80 degrees. For other variations of the lure as will be discussed below the angle may be increased. In some constructions the blade 6 may be rotated; that is, the vertical plane presented by the blade may be rotated at an angle to a longitudinal axis of the body 4.

Figure 6:
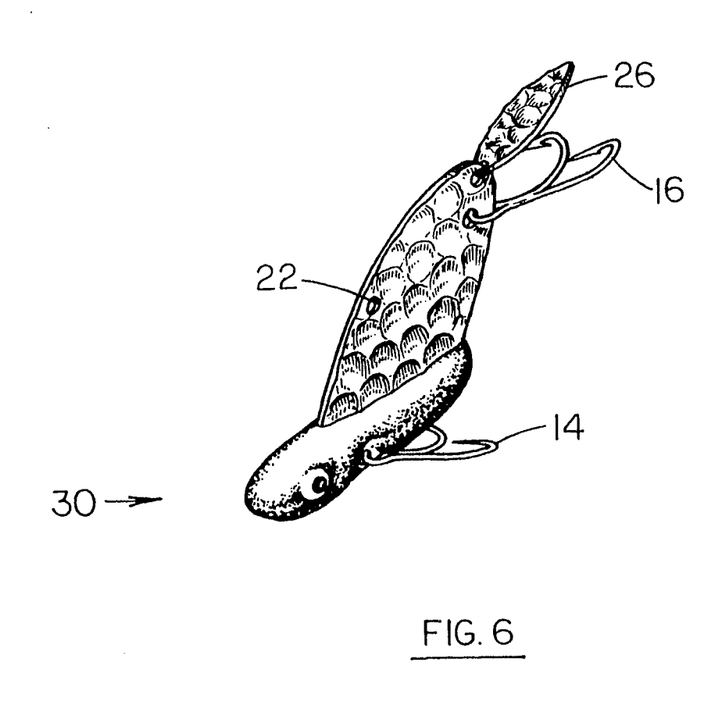
FIG. 6 is a drawing of a lure with hammered blade surface and trailer blade.
Figure 7:
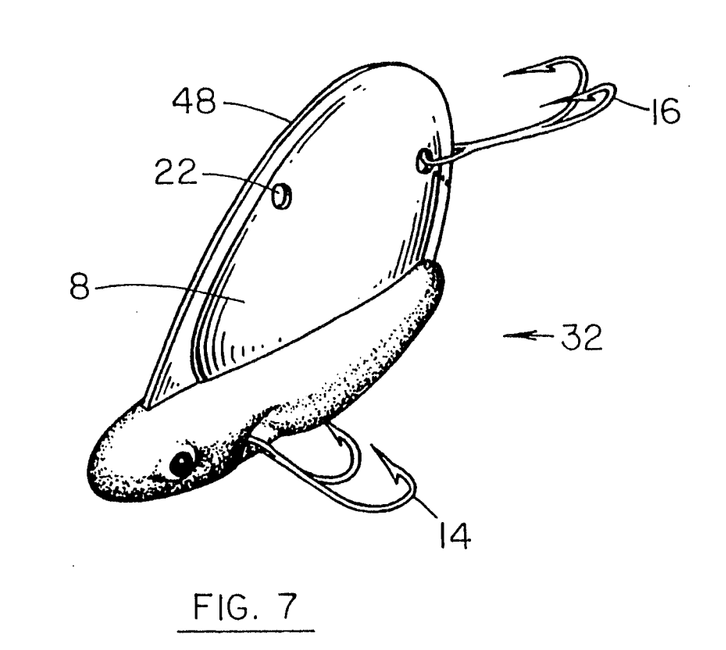
FIG. 7 is a drawing of a lure with a rounded concave blade.

Varieties of colors or surface finishes or aerodynamic shapes may also be molded into the body 4 and/or added as ornamentation during assembly. In this regard, separately attached attractors may also be added to the blade 6, such as small spinner blades 24, 26, reference the lures 28, 30 of FIGS. 5 and 6. The blades 24, 26 may be coupled to the blade 6 with a swivel 20 or directly. Similarly, live bait keepers, or so called "stinger" hooks 31, can also be added, reference FIG. 8.

The position of the body 4 relative to the blade 6 may also be molded to extend in varying degrees beyond or behind the forward leading edge of the blade 6, such that water passes over the forward surface of the body 4 before encountering the blade 6. In such instances, the presentation of the blade concavity 8 is affected. The positioning of the line attachment apertures 22 accomplishes a similar end. It may also be preferable to increase the depth of the blade concavity. FIGS. 5 through 10 depict lures 28, 30, 32, 36 and 38, which reflect differing orientations and component shapes of the blade 6 and body 4.

Figure 9:
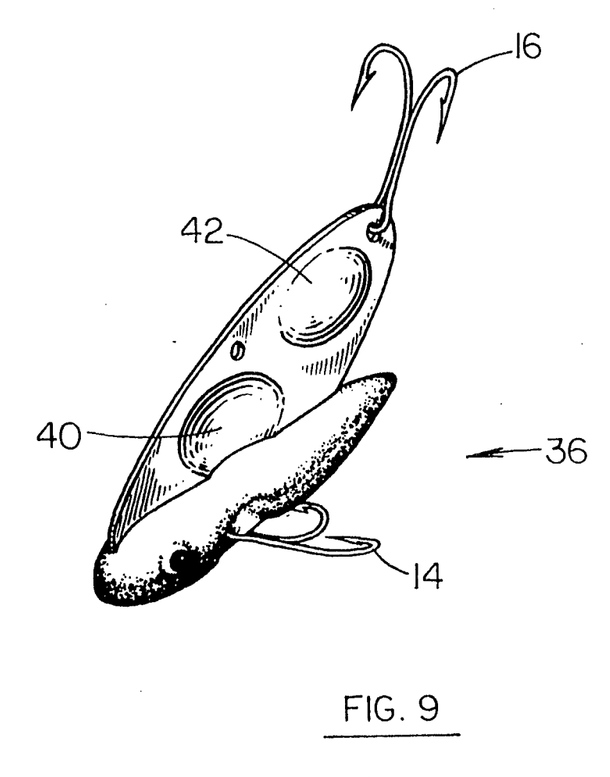
FIG. 9 is a drawing of a lure with a forward mounted blade and back-to back concave/convex surface portions.
Figure 10:
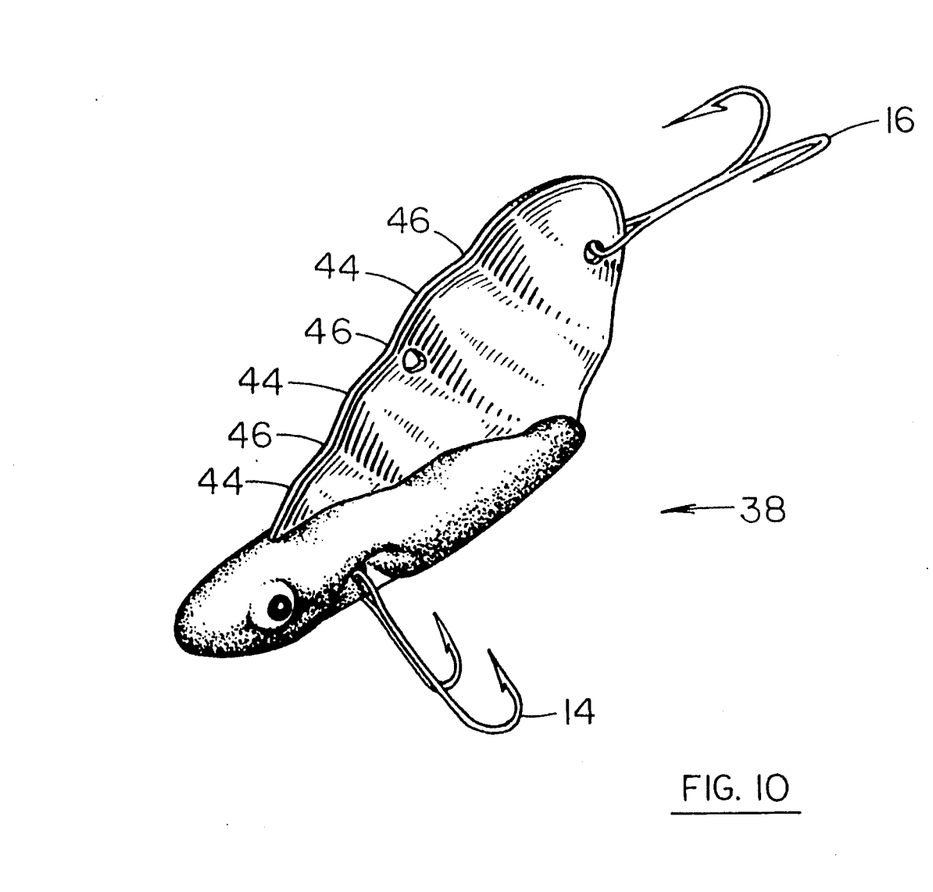
FIG. 10 is a drawing of a lure with a ripple blade or having alternating concavities over its length.

In lieu also of presenting the concavity 8 along only one side of the blade 6, the blade 6 may be formed with back-to-back concavities 40, 42, such as in the lure 36 of FIG. 9. Multiple, alternating zones of concavity 44, 46 may also be presented over the exposed surface of the blade, as in the lure 38 of FIG. 10. The depth of the concavities for each zone can also be varied, for example, by using a more rounded or so called "Colorado" blade 48 as in the lure 32 of FIG. 7. The concavities may be formed on the same surface of the blade (reference the lure 50 of FIG. 13) or may successively extend from one zone into the next.

Figure 11:
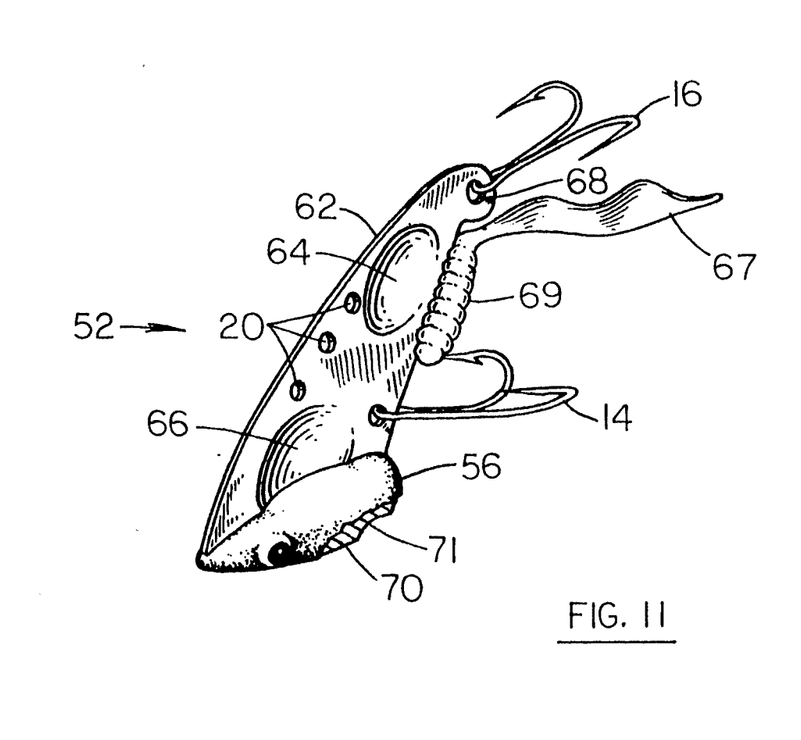
FIG. 11 is a drawing of a hi-profile standup lure with a blade containing multiple zones of concavity and wherein the body includes a descent affecting cavity shown in cutaway.
Figure 12:
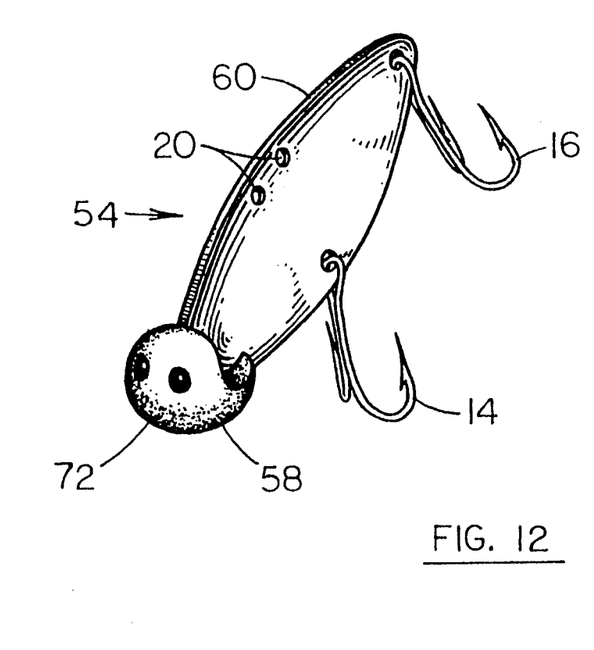
FIG. 12 is a drawing of a standup lure including a wide body.

In regard to differing relative body/blade positions, FIGS. 11 and 12 depict lures 52, 54 which provide a "standup" action. Each of the lures 52, 54 is generally configured to include a body portion 56, 58 which is positioned at an extreme end of the blade 60, 62. Upon descending to depth, the weighted bodies 56, 58 support the blades 60, 62 in upstanding relation to the lake or river bottom. The hooks 14, 16, which may be baited with a live bait attractor, are thereby presented in a posture which facilitates hooking.

With particular reference to the lure 52 of FIG. 11 the blade 62 includes upper and lower movement affecting cavities 64, 66 which are directed to one side of the lure, as opposed to being directed in alternating directions, such as in the lure 36 of FIG. 9. The hook 16 of the lure 52 is also secured to a trailing or tail section 68 which extends slightly posterior of the lure 52. A molded plastic or rubber tail member 69 is secured to the aft vertical edge of the blade 62 and a filamentary tail 67 projects past the hook 16.

The body 56 otherwise is formed to include a relatively flat bottom surface 70 such that the lure tends to remain upright. A hollowed cavity space 71 in the body 56 is provided to slow lure descent.

Figure 13:
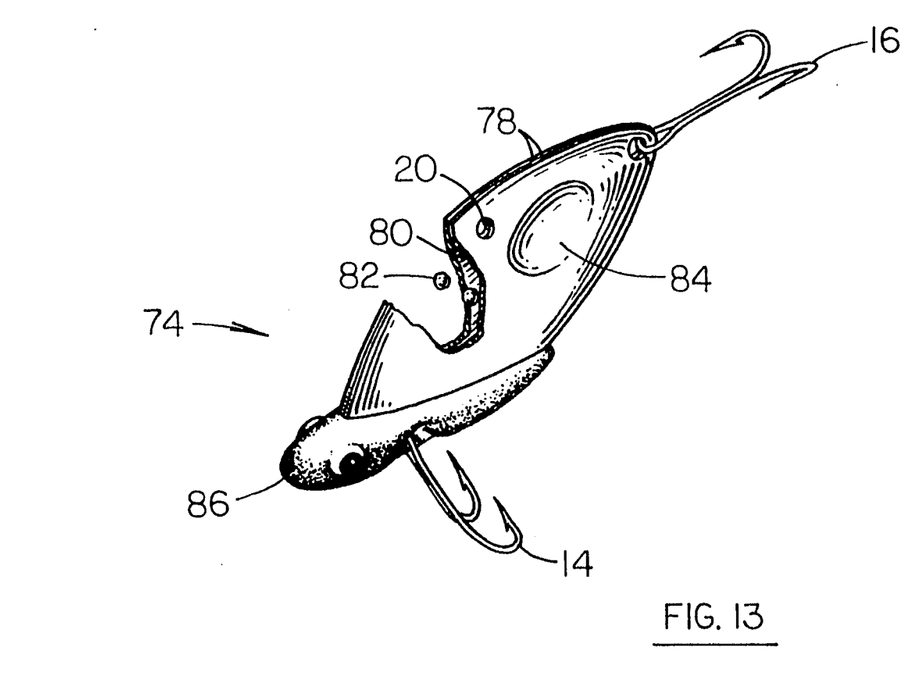
FIG. 13 is a drawing shown in partial cutaway of a lure with multiple blades arranged to create a hollow rattle chamber.
Figure 14:
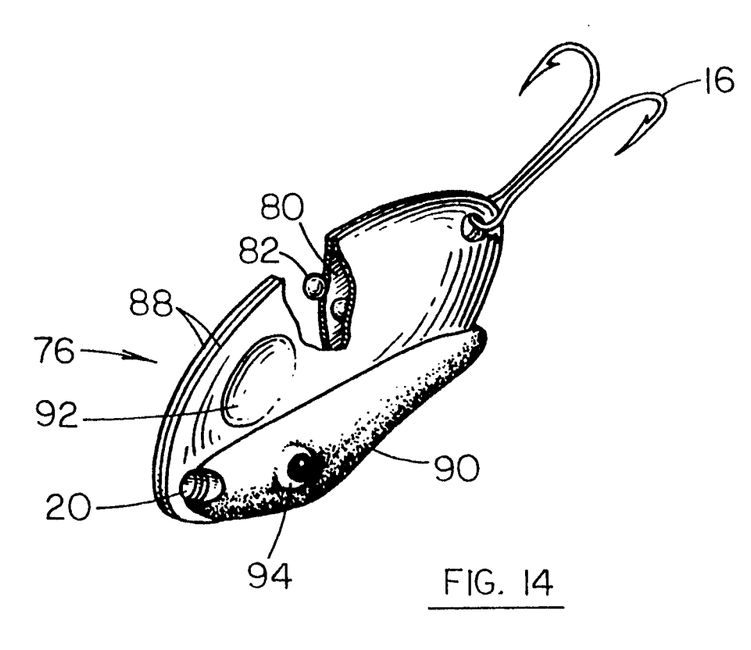
FIG. 14 is a drawing of a lure having a lower profile than the lure of FIG. 11 and including multiple blades arranged to create a hollow rattle chamber.

The lure 54 of FIG. 12, in turn, provides a blade 62 having a configuration akin to that of the lure 2 of FIGS. 1 through 4. Specifically, a "willow leaf" configuration is used. The body 58 also exhibits a more rounded configuration in distinction to the body 70 of the lure 52. Although the body 58 is rounded, a flattened surface 72 is provided which similarly supports the lure 54 in upright relation to the lake bottom Lastly, FIGS. 13 and 14 depict still other constructions of blade lures 74, 76. Each of these lures is distinguished from the foregoing via the inclusion of multiple blades which are mounted relative to one another to create hollow chambers The lure 74 particularly provides a pair of blades 78 which are mounted in back-to-back relation to one another and whereby a center cavity 80 is formed. Mounted within the cavity 80 are a number of beads 82 which create a so called "rattle" action as the lure traverses the water. That is, the beads 82 are free to move about the interior cavity 80 to randomly strike the inner surfaces and create sounds.

Formed into the exposed outer surfaces of the blades 78 is a concavity 84 which acts in a similar fashion to the foregoing concavities to facilitate lure motion. The body 86 may otherwise contain other aerodynamic features to facilitate movement and a rattle action. For such lure constructions, it is to be appreciated that additional apertures and/or protrusions, as discussed above, may be required to best secure the blades 78 to the body 86.

With attention to the lure 76 of FIG. 14, still another "rattle" lure 76 is shown. The lure 76 contains a pair of blade members 88 which are mounted to create a hollow cavity 80 and support beads 82. However, the blades 88 are rotated relative to the body 90 to present a lower profile of the blades 88. The body 90 thus extends along a substantial portion of the lower peripheral edge of the blades 88. This position facilitates securing the blades to the body, since a larger contact area exists between the blades 88 and body 90. Movement of the lure 76 is enhanced through the addition of concavities 92 and shaped surfaces, such as the bulbous eyes 94 along the body. Depending upon the projection of the eyes 94, the lure position may be stabilized when in contact with the bottom.

Whereas, the blades of the lures of FIGS. 1 through 14 have been depicted with respect to separately stamped blade inserts, it is to be understood that the blades can be fabricated as an integral part of the lure body. For such constructions, the lure may be molded about a weighted core with distinguishable wing and body portions being formed into the lure. The body may also be molded from lead substitutes to accommodate environmental concerns.

Figure 8:
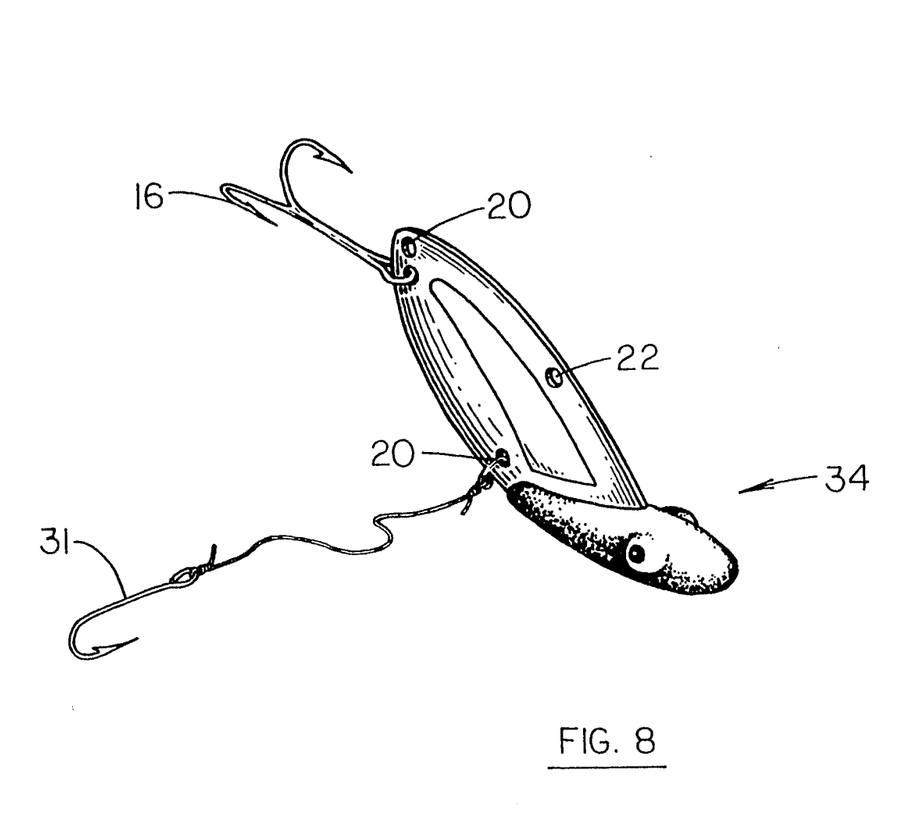
FIG. 8 is a drawing of a small bodied lure including an adhesively bound attractor.

In lieu also of painting or anodizing the lures of FIGS. 1 through 14 to preferred color schemes, the lures can be partially or completely dip-coated or otherwise sealed within a durable outer covering of a desired color scheme. Alternatively, an adhesive colored attractor 94, such as shown in FIG. 8 can be secured to the blade or body. The attractor can be die cut to an appropriate shape and may be printed with desired lines, colors, etc. to enhance the attracting qualities of the lure. The surface may also be made to be light reflective and/or include areas of different texture. The tape may also exhibit properties which provide coloration changes with temperature and/or light changes relative to the water. Such thermo-chromatic and light-chromatic materials are available from various vendors.

While the present invention has been described with respect to a number of presently preferred constructions and various considered modifications and improvements thereto, it is to be appreciated that still other modifications may suggest themselves to those of skill in the art. The invention should therefore be interpreted to include all those equivalent embodiments within the spirit and scope of the following claims.

What is claimed is:

1. A fishing lure comprising:
   a) a body formed from a material exhibiting a relatively large specific gravity with respect to water;
   b) an ovularly shaped blade including a fore end mounted within said body and an aft end projecting in upright relation to the body at an acute vertical angle in the range of 10 to 80 degrees relative to a longitudinal axis of said body and exhibiting a concavity over a substantial portion of an exposed surface thereof and wherein the concavity is positioned to induce lure movement when retrieved;
   c) a hook; and
   d) means for securing said hook and a fishing line to said lure.

2. Apparatus as set forth in claim 1 wherein a portion of said body extends beyond a peripheral edge of said fore end and wherein a portion of the body secured to the blade extends along the blade at least one-half the length of the blade.

3. Apparatus as set forth in claim 2 wherein a portion of said blade is exposed through said body and includes an aperture whereat the hook is secured.

4. Apparatus as set forth in claim 1 including means for securing live bait to said lure.

5. Apparatus as set forth in claim 1 including attractor means flexibly extending from the lure.

6. Apparatus as set forth in claim 5 wherein the attractor means includes thermo-chromatic means secured to said lure for changing colors with varying water temperature.

7. Apparatus as set forth in claim 5 wherein the attractor means includes photo-chromatic means secured to said lure for changing color with varying degrees of light illumination.

8. Apparatus as set forth in claim 5 wherein the attractor means comprises a second concave blade and means for securing the second blade to the first blade.

9. Apparatus as set forth in claim 1 wherein said blade includes a plurality of concave regions and ones of which regions are exposed to effect lure movement.

10. Apparatus as set forth in claim 9 wherein said blade includes a front and a rear surface and wherein ones of said concave regions extend from said front and others extend from said rear surface.

11. Apparatus as set forth in claim 10 wherein said concave regions are progressively offset from one another along the same surface of the blade.

12. Apparatus as set forth in claim 1 including a second blade exhibiting a concavity over a substantial portion thereof mounted to the body and such that the concavities of the first and second blades form a hollow chamber therebetween, and including a plurality of beads mounted within the chamber.

13. Apparatus as set forth in claim 1 wherein the body includes a flattened region positioned at a forward end of the body such that the blade and lure stand upright upon resting upon a stationary support surface.

14. Apparatus as set forth in claim 13 wherein the concavity is formed in a surface of the body which is normally presented during lure descent and whereby the descent of the lure is slowed.

15. Apparatus as set forth in claim 1 wherein the body includes portions which laterally project from the sides of the body to affect lure motion upon retrieval and which portions stabilize the lure with the blade positioned upright when resting on a support surface.

16. Apparatus as set forth in claim 1 including means having a hollow cavity and supporting a plurality of beads, whereby sounds are created upon lure movement through water.

17. A fishing lure comprising:
a) a body formed from a material exhibiting a relatively large specific gravity with respect to water;
b) first and second blades rigidly mounted within said body, wherein each blade has a plurality of regions of concavity which occupy a substantial portion of an exposed portion of the blades, wherein a longitudinal axis of each blade projects at an acute vertical angle in the range of 10 to 80 degrees relative to a longitudinal axis of the body, wherein ones of the regions of concavity of the first and second blades are positioned relative to one another to form a hollow chamber therebetween and within which chamber a plurality of bead members are contained and wherein others of the regions of concavity of the first and second blades are positioned to induce lure movement when retrieved and whereby sounds are created upon lure movement through water;
c) a hook; and
d) means for securing said hook and a fishing line to said lure.

18. A fishing lure comprising:
a) an elongated body formed from molten lead and including bulbous projections laterally projecting therefrom;
b) a metal blade projecting in upright relation to the body and exhibiting at least one region of concavity over a substantial portion of an exposed surface thereof, wherein a portion of the blade is exposed through said body, wherein said blade includes a plurality of apertures, and wherein a portion of said body extends beyond a leading peripheral edge of said blade and a longitudinal axis of a said blade projects at an acute vertical angle in the range of 10 to 80 degrees relative to a longitudinal axis of the body;
c) a plurality of hooks; and
d) means for securing said hooks and a fishing line to said lure at ones of said apertures.

19. A fishing lure comprising:
a) a body formed from a material exhibiting a relatively large specific gravity with respect to water;
b) an ovular blade including a fore end mounted within said body and an aft end projecting in upright relation to the body at an acute vertical angle in the range of 10 to 80 degrees relative to a longitudinal axis of said body and wherein said blade includes a plurality of regions of concavity which occupy a substantial portion of an exposed surface thereof and wherein the regions of concavity are positioned to induce a laterally oscillating lure movement when retrieved;
c) a hook;
d) means for securing said hook and a fishing line to said lure.

* * * * *